(12) United States Patent
Boer et al.

(10) Patent No.: US 7,895,495 B2
(45) Date of Patent: Feb. 22, 2011

(54) ACKNOWLEDGEMENT MESSAGE MODIFICATION IN COMMUNICATION NETWORKS

(75) Inventors: Jan Boer, Odijk (NL); Wilhelmus Diepstraten, Haghorst (NL); Joachim S. Hammerschmidt, Mountain View, CA (US); Syed Aon Mujtaba, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 24 days.

(21) Appl. No.: 12/422,696

(22) Filed: Apr. 13, 2009

(65) Prior Publication Data

US 2009/0199076 A1   Aug. 6, 2009

Related U.S. Application Data

(63) Continuation of application No. 11/121,191, filed on May 3, 2005, now Pat. No. 7,526,705.

(51) Int. Cl.
*G08C 25/02* (2006.01)
*H04L 1/18* (2006.01)
*H03M 13/00* (2006.01)

(52) U.S. Cl. .................. 714/748; 714/751
(58) Field of Classification Search ............. 714/748, 714/751
See application file for complete search history.

(56) References Cited

U.S. PATENT DOCUMENTS

| | | | |
|---|---|---|---|
| 4,093,823 A * | 6/1978 | Chu ........................... 370/535 |
| 5,432,798 A * | 7/1995 | Blair ........................... 714/748 |
| 5,444,718 A * | 8/1995 | Ejzak et al. .................. 714/748 |
| 5,537,416 A | 7/1996 | MacDonald et al. .......... 371/32 |
| 5,581,767 A | 12/1996 | Katsuki et al. ................. 712/11 |
| 6,282,172 B1 | 8/2001 | Robles et al. ................. 370/230 |
| 6,700,867 B2 * | 3/2004 | Classon et al. .............. 370/216 |
| 6,778,501 B1 * | 8/2004 | Malmgren et al. .......... 370/236 |
| 7,496,076 B2 * | 2/2009 | Takagi et al. ................. 370/338 |
| 2004/0082294 A1 | 4/2004 | Ekl et al. .................... 455/3.05 |
| 2004/0139386 A1 | 7/2004 | Ishimura et al. ............. 715/500 |

FOREIGN PATENT DOCUMENTS

| JP | 57099840 A | * | 6/1982 |
| JP | 357099840 A | | 6/1982 |
| JP | 359172863 A | | 9/1984 |
| JP | 402001647 A | | 1/1990 |

* cited by examiner

*Primary Examiner*—Joseph D Torres
(74) *Attorney, Agent, or Firm*—Mendelsohn, Drucker & Associates, P.C.; Kevin M. Drucker; Steve Mendelsohn (57) ABSTRACT

A station for a communications network. In one embodiment, the station includes a decoder, a check processor, and a transmitter. The decoder is adapted to decode a received encoded data unit. The check processor is adapted to determine whether the encoded data unit has been correctly received. The transmitter is adapted to initiate, prior to the check processor completing the determination whether the encoded data unit has been correctly received, the transmission of an acknowledgment message comprising a frame having a plurality of different fields of data. The transmitter is adapted to modify the transmission of the acknowledgment message if the check processor determines that the data unit has not been correctly received.

17 Claims, 9 Drawing Sheets

ACKNOWLEDGEMENT MESSAGE MODIFICATION IN COMMUNICATION NETWORKS

CROSS-REFERENCE TO RELATED APPLICATION

This application claims priority to copending U.S. patent application Ser. No. 11/121,191, filed on May 3, 2005, the entire disclosure of which is incorporated herein by reference in its entirety.

BACKGROUND OF THE INVENTION

1. Field of the Invention

The present invention relates to data transmission and detection in communications networks, and, in particular, to the generation and transmission of an acknowledgment message to inform a transmitter that the receiver successfully received a message from the transmitter.

2. Description of the Related Art

One of the goals in the design of modern mobile communications systems is to increase network throughput, i.e., the bit rate of data traveling over wireless channels. Improvements in throughput can be achieved in a number of ways, e.g., exploiting spatial diversity by using multiple antennas at both the transmitter and receiver sides in a wireless local area network (WLAN), a technique referred to as multiple-input multiple-output (MIMO).

Improved throughput can also be achieved through a technique known as Quadrature Amplitude Modulation (QAM), whereby a group of buts are "mapped" onto a constellation point on a two-dimensional grid. The x-axis of the grid represents the amplitude of the cosine component in the eventual signal generated based on the constellation point, where as the y-axis represents the amplitude of the sine component in the eventual signal generated based on the constellation point. Accordingly, two amplitude-modulated (AM) signals are effectively combined into a single channel, thereby doubling the effective bandwidth.

Another method for achieving improved throughput, which may or may not be used in conjunction with MIMO, is orthogonal frequency division multiplexing (OFDM). In OFDM, a wideband channel is divided into narrowband "sub-channels" that are used to multiplex data, such that the center frequencies of the sub-channels (also called "tones" or "sub-carriers") and the symbol durations are chosen to permit maximum packing density of those sub-channels. OFDM can provide very high performance, including a low error rate and a long range, by employing advanced detection schemes at the receiver. One such scheme is Iterative Demodulation/Decoding (IDD), in which soft decisions of all bits of a message are cycled between a MIMO QAM demodulator (or "demapper") and a sequence decoder. In this manner, the reliability of the soft decisions gradually improves, until hard decisions on each message bit are eventually made in a final iteration. Another advanced detection scheme is Successive Interference Cancellation (SIC), in which parts of a message are hard-decoded, remodulated, and subtracted from the actual antenna signals, resulting in a cleaner signal from which the remaining parts of the message are subsequently demodulated (or "demapped") and decoded. In MIMO-OFDM, the different parts of a message that are decoded successfully in SIC are typically referred to as "layers," i.e., signals transmitted from one transmit antenna that arrive at a plurality of receive antennas and overlay linearly with the layers arriving from one or more of the remaining transmit antennas.

Although the aforementioned advanced detection schemes may provide superior performance, they can introduce significant latency, i.e., processing delay, before the final decisions can be sent to the Medium Access Control (MAC) circuitry. The MAC circuitry performs a Cyclic Redundancy Check (CRC) on the message data it receives before further processing the message. If the CRC check is successful, then the MAC circuitry requests that the modem (or other device receiving the message data) transmit an Acknowledgment (ACK) frame back to the transmitter to confirm that the message was successfully received. If the CRC check fails, then the modem has an indication that an error occurred in the overall transmission. In this case, no ACK frame is transmitted back to the transmitter, and the transmitter attempts to retransmit the message as soon as it regains access to the wireless medium.

The time span between the last signal component of the incoming data frame and the first signal component of the ACK frame is precisely regulated. According to the IEEE 802.11 standard, this time period, which is referred to as the Short Interframe Spacing (SIFS) period, is 16 microseconds. Even with conventional WLAN transmission formats and detection schemes, this time budget can be very tight because, in addition to the detection, other tasks may need to be performed at the receiver in chronological order. Accordingly, in the event advanced detection schemes are desired for improved performance, the tasks being performed on an incoming message might not be completed in time for the ACK frame transmission.

Figure 1:
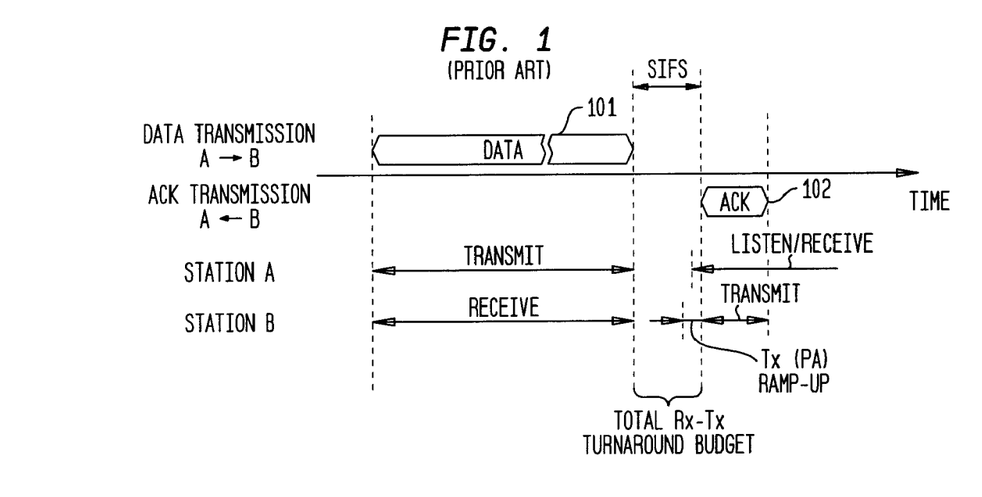
FIG. 1 is a timing diagram illustrating a prior art method for transmitting (i) a data frame from a first station to a second station and (ii) an ACK frame from the second station to the first station.

Turning now to FIG. 1, the timing of a conventional process in a WLAN for transmitting a data frame 101 from a first station A to a second station B and for transmitting the corresponding ACK frame 102 from station B back to station A is illustrated. As shown, first, data frame 101 is transmitted from station A to station B. The total amount of time that station B has to switch between reception of data frame 101 and transmission of ACK frame 102 is limited by the SIFS period. During the SIFS period, station B must accomplish all tasks related to the reception of data frame 101, including determining the integrity of the packet by performing a CRC check. Also during the SIFS period, physical delays, such as those caused by analog radio propagation channel, transmit-to-receive, and receive-to-transmit turnaround times, can occur. The most common cause of these physical delays is transmitter ramp-up, including power amplifier (PA) ramp-up. In the process of FIG. 1, if the CRC check is successful, then ACK frame 102 is transmitted. If the CRC check is unsuccessful, then no ACK frame is transmitted, thereby causing station A to retransmit data frame 101 at a later time.

Figure 2:
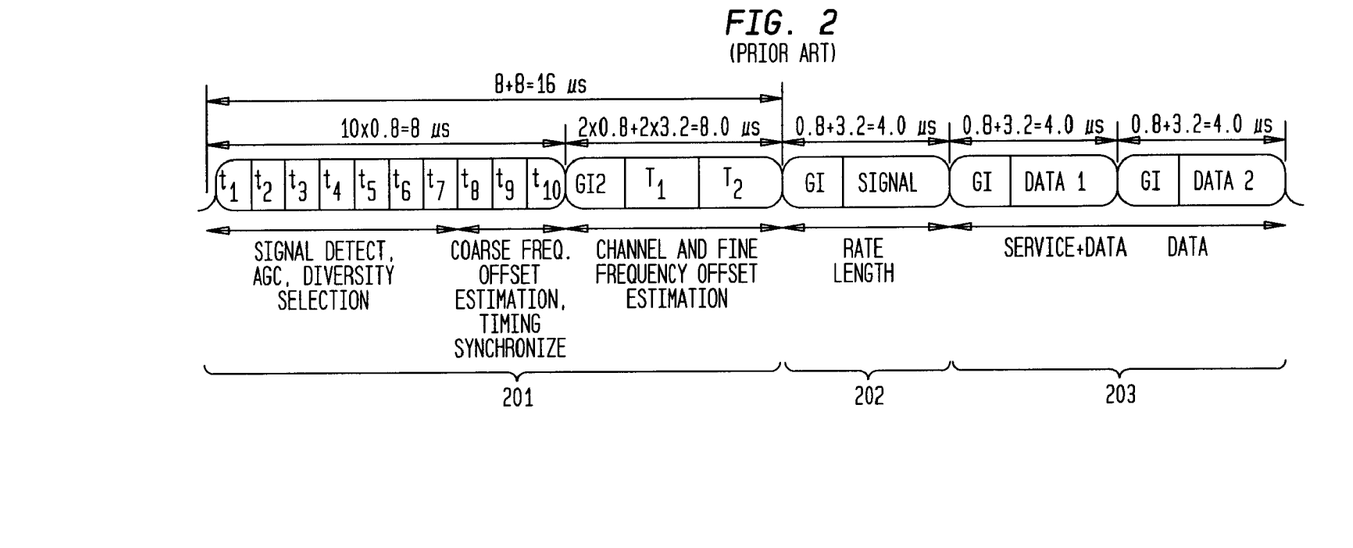
FIG. 2 is a graphic illustration of a PHY frame format consistent with the IEEE 802.11a/g standard in an OFDM implementation.

With reference now to FIG. 2, a PHY (physical layer) frame format of a data frame (e.g., data frame 101 of FIG. 1) consistent with the IEEE 802.11a/g standard in an OFDM implementation is shown graphically. As shown, the frame format has a preamble 201, a signal field 202, and a data portion 203. Preamble 201 consists of ten short training symbols $t_1$ through $t_{10}$ a guard interval (GI2), and two long training symbols $T_1$ and $T_2$. Signal field 202 contains a guard interval (GI) and several signaling parameters for the current transmission, e.g., its length and data rate in Mbps. Data portion 203 includes two data symbols, each preceded by a guard interval (GI). While data portion 203 of FIG. 2 has only two data symbols, different numbers of data symbols might be included in an IEEE 802.11 data frame. Included in one or more of the symbols is a MAC frame (shown in further detail in FIG. 3), which is described in further detail below.

Figure 3:
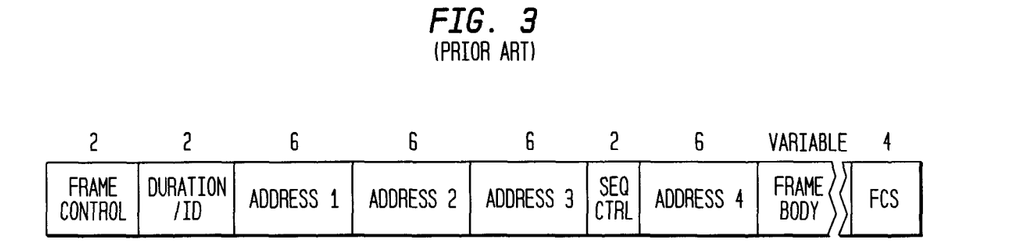
FIG. 3 is a graphic illustration of a MAC frame format consistent with the IEEE 802.11 standard.

FIG. 3 illustrates graphically the MAC frame format of a data frame (e.g., DATA 1 of FIG. 2) consistent with the IEEE 802.11 standard. The various fields shown contain the information exchanged between the MAC instances at the transmitter and receiver stations. This information typically includes the access to the medium, addressing, data checking, and data framing. Each MAC instance may hold counters about received and transmitted frames and several timers required for network management. The Address 1 field contains the destination address, and the Address 2 field contains the source address. A receiver that receives a MAC frame tries first to decode the Address 1 field at an early point in time. If it is determined that a different station is the intended recipient, then processing of the remaining portions of the packet is not performed. The frame body field contains the frame data, and a frame checksum (FCS) field appears at the end of the frame for use in verifying whether the frame was correctly received.

Figure 4:
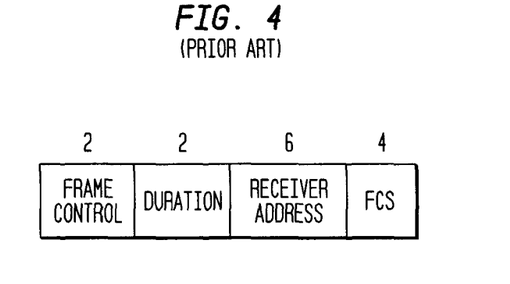
FIG. 4 is a graphic illustration of an ACK frame format consistent with the IEEE 802.11 standard.

With reference now to FIG. 4, the format of an exemplary ACK frame (e.g., ACK frame 102 of FIG. 1) consistent with the IEEE 802.11 standard is illustrated graphically. As shown, the ACK frame includes fields for frame control, duration, destination receiver address, and frame checksum (FCS).

Figure 5:
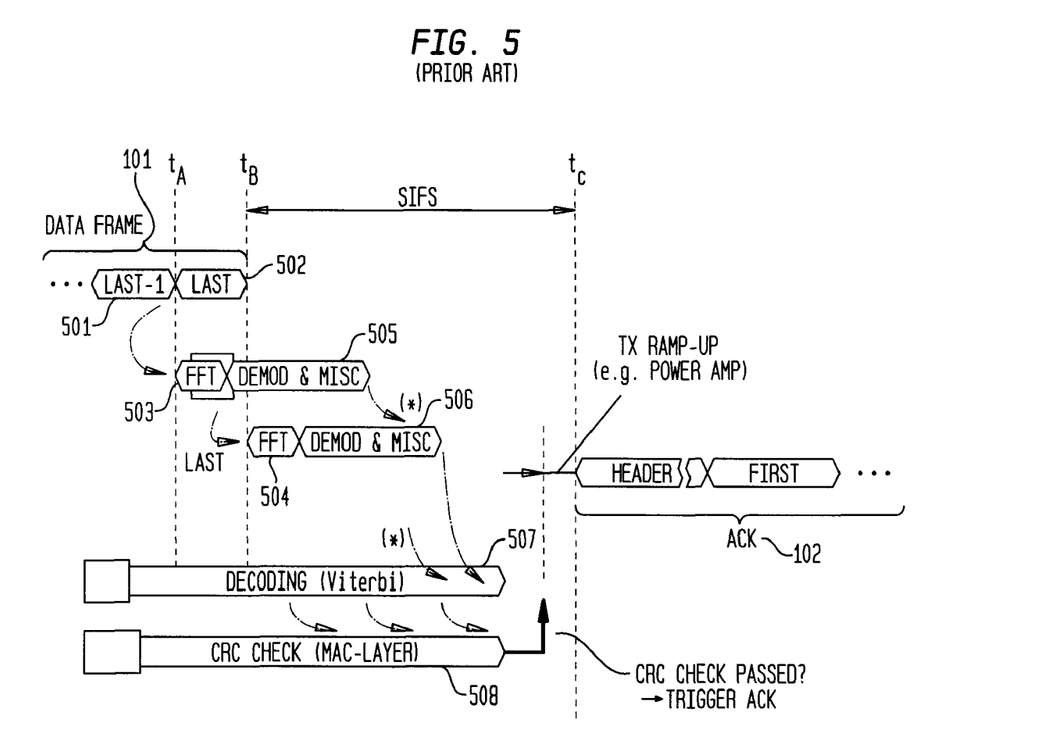
FIG. 5 is a timing diagram illustrating an exemplary prior art data flow in a WLAN receiver using OFDM.

FIG. 5 is a timing diagram illustrating an exemplary prior art data flow in a WLAN receiver using OFDM under IEEE 802.11a/g, which data flow corresponds to the role of station B of FIG. 1. Last-1 segment 501 represents the penultimate data symbol of frame 101 of FIG. 1. Last segment 502 represents the last data symbol of data frame 101 of FIG. 1. Various analog-to-digital conversion and signal calibration steps (not shown) may be performed on these data symbols. The OFDM data symbol of segment 501 is processed by a Fast Fourier Transformation (FFT) (503) and demodulation/demapping (and possibly deinterleaving) operations (505). The OFDM data symbol of segment 502 is processed by an FFT (504) and demodulation/demapping (and possibly deinterleaving) operations (506). The result of this processing is a set of "soft bits" (i.e., likelihood values) that are forwarded to a Vitterbi decoder 507, which, based on the sequence of soft bits, generates the most likely message of information bits and forwards the message, bit by bit, to MAC circuitry 508, where the CRC check is carried out. If the CRC check is successful, then the message is forwarded to higher communication layers (e.g., TCP/IP), and ACK frame 102 is transmitted. The CRC check result is available a sufficient amount of time before the end of the SIFS period to enable ramp-up of the transmitter (e.g., the power amplifier) by the end of the SIFS period.

Figure 6:
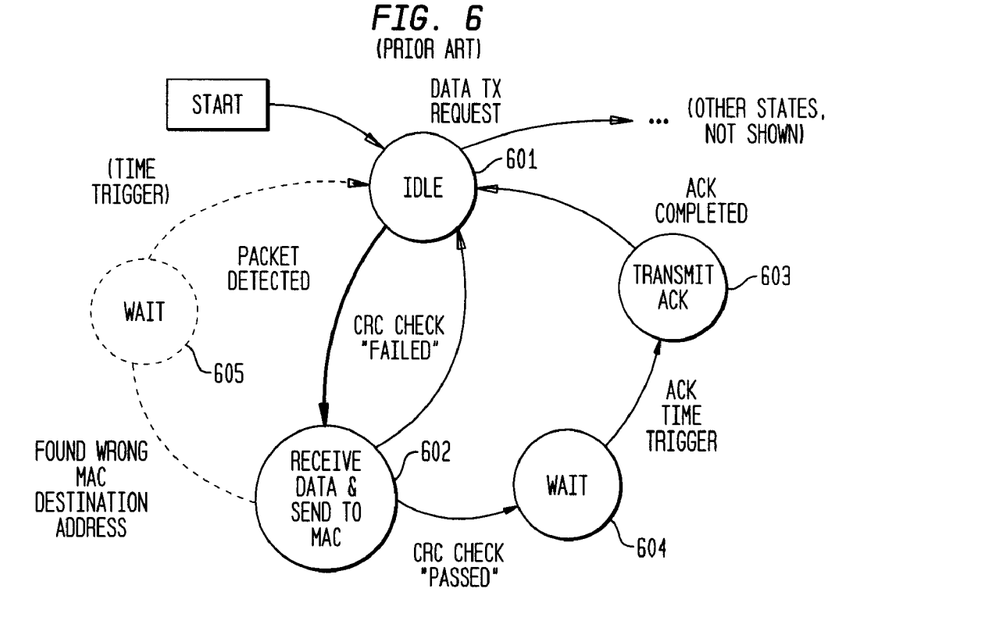
FIG. 6 is a state diagram illustrating exemplary states of a state machine in a prior art WLAN receiver using OFDM.

FIG. 6 is a state diagram illustrating exemplary states of a state machine in a prior art WLAN receiver using OFDM, wherein the state machine is embodied in a receiver corresponding to the role of station B of FIG. 1, whose data flow is illustrated in FIG. 5. The states include Idle state 601, Receive Data & Send to MAC state 602, Transmit ACK frame state 603, and Wait states 604 and 605. The state machine begins in Idle state 601 and remains there until a packet is detected, in which case Receive Data & Send to MAC state 602 is entered. In Receive Data & Send to MAC state 602, detection and CRC checking are performed. If, during the detection process, it is determined that the MAC destination address (Address 1 field in FIG. 3) reveals that the packet is intended for another station, then the present station will revert to Idle state 601. This reversion might not occur until a time trigger is issued that the channel is once again usable, the wait for the time trigger being represented by Wait state 605. If the MAC destination address reveals that the packet is indeed intended for the present station, then the detection process continues. Once detection is complete, if the CRC check fails, then the state machine returns to Idle state 601. If it is determined that the CRC check is successful, then the state machine enters Wait state 604 until the end of the SIFS period, at which time Transmit ACK frame state 603 is entered, and the ACK frame is transmitted. Once the ACK frame is complete, the state machine returns to Idle state 601. The amount of time spent in Wait state 604 between the outcome of the CRC check and the time trigger to send the ACK frame might be rather limited, due to the large number of tasks that need to be carried out during the SIFS period and which cannot always be parallelized. The station acting as a receiver in the present transmit request can transmit its own frames as well, in which case, in the initial Idle state 601, the receiver would undergo other states, not shown in FIG. 6 or described herein.

Figure 7:
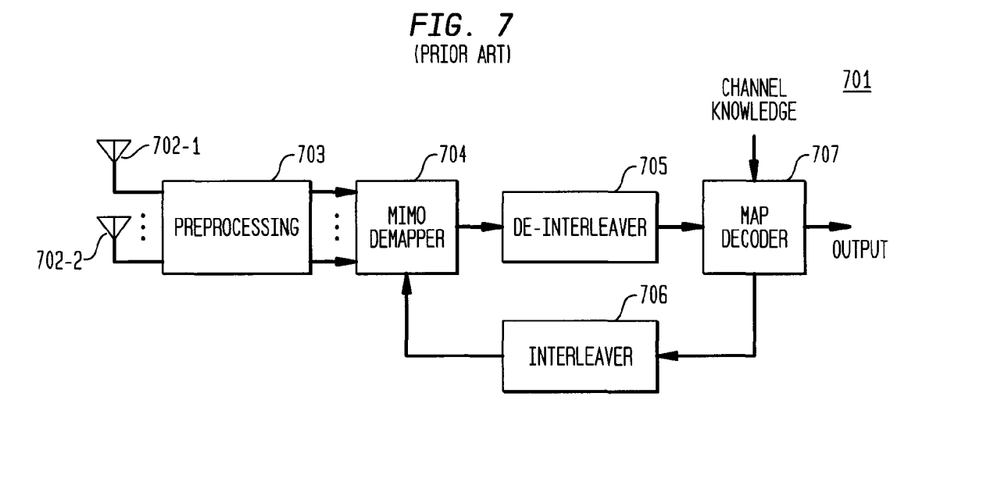
FIG. 7 is a block diagram illustrating an exemplary hardware configuration for a high-performance detection scheme employing Iterative Demapping/Decoding (IDD) in a WLAN receiver using OFDM.

FIG. 7 shows an exemplary hardware configuration 701 for a high-performance detection scheme employing Iterative Demapping/Decoding (IDD) in a WLAN receiver using OFDM. The transmit scheme corresponding to this mechanism is referred to as Space-Time Bit-Interleaved Coded Modulation (ST-BICM). Symbols received at antennas 702-1, 702-2 are provided to preprocessing circuitry 703, which includes, e.g., performing Fast Fourier Transformations. The output of preprocessing circuitry 703 is provided to a MIMO demapper 704, which generates, for each bit coded into a MIMO-ODFM subcarrier (e.g., using QAM modulation), a soft bit using the signals from the channel that are received at antennas 702-1, 702-2, and possibly also using extrinsic information obtained from a Maximum A Posteriori (MAP) decoder 707. In the first iteration, no extrinsic information is yet available, so the soft bits are generated based solely on the signals received at antennas 702-1, 702-2. Next, the soft bits are provided to a deinterleaver 705 to be deinterleaved. MAP decoder 707 then uses the information provided by deinterleaver 705 and the properties of the (convolutional) channel code to produce improved soft bits. The extrinsic information, i.e., the estimate of each bit provided by MAP decoder 707, is passed back to demapper 704 after being re-interleaved by interleaver 706, which provides its output to demapper 704. Demapper 704 can now use this extrinsic information to improve the demapping process, thereby producing further-improved soft bits. The decoding process repeats until the iterative process is complete and hard bits are generated as the output of MAP decoder 707.

Figure 8:
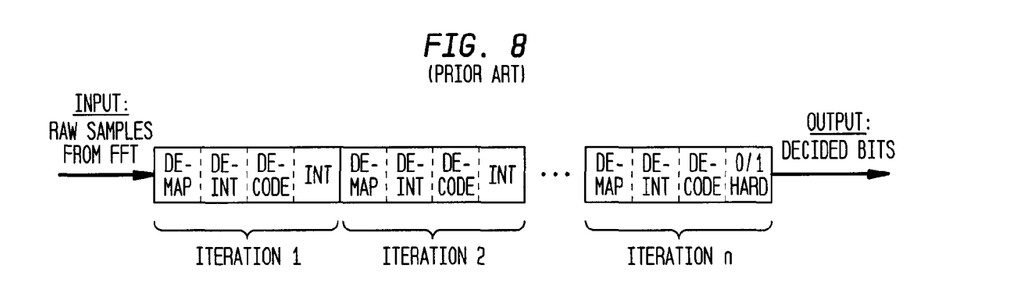
FIG. 8 is a graphic representation of the temporal succession of the various demapping/decoding and deinterleaving/interleaving iterations in the exemplary hardware configuration of FIG. 7.

With reference now to FIG. 8, the temporal succession of the various demapping/decoding and deinterleaving/interleaving iterations in the exemplary hardware configuration of FIG. 7 is shown. As can be seen, the first iteration receives raw samples from the Fast Fourier Transform circuitry. Each iteration involves demapping, deinterleaving, decoding, and interleaving, except for the final iteration, which involves only demapping, deinterleaving, decoding, and a final step of making hard-bit decisions of the data contained in the message.

Figure 9:
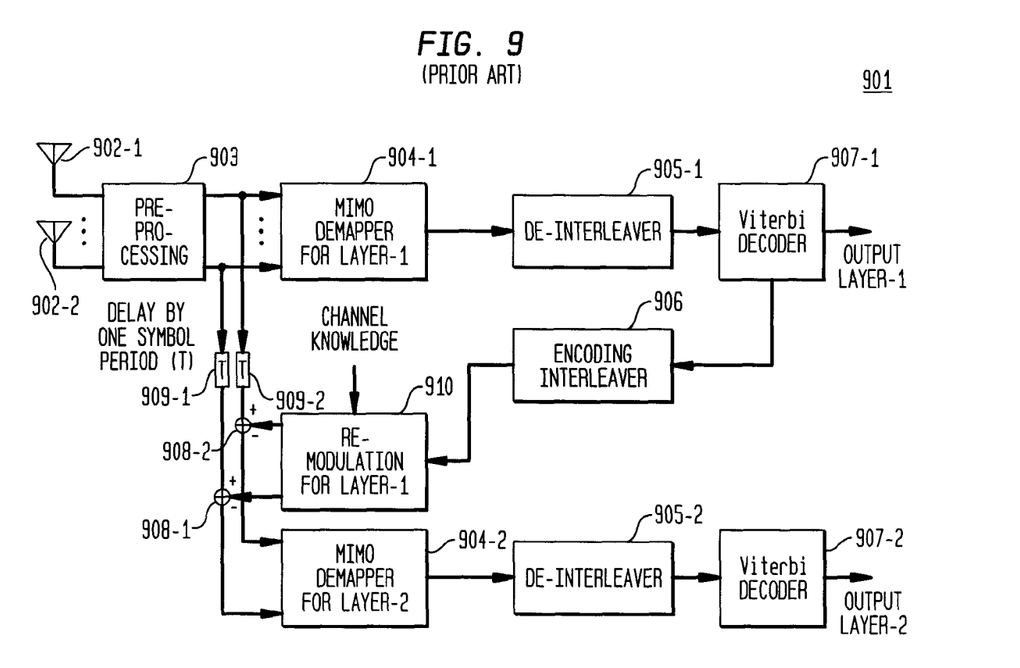
FIG. 9 is a block diagram illustrating an exemplary hardware configuration for a high-performance detection scheme employing Vertical Bell Labs Layered Space-Time (V-BLAST) code.

FIG. 9 illustrates another exemplary hardware configuration 901 for a high-performance detection scheme. The transmit scheme corresponding to this mechanism is referred to as Vertical Bell Labs Layered Space-Time (V-BLAST) code modulation. In this scenario, a single signal "layer" (i.e., the bits corresponding to a (QAM) symbol transmitted from only one of the several transmit antennas) at a time is initially demapped, while the signal components corresponding to the (QAM) symbols from other transmit antennas also present are temporarily ignored. Then, MIMO Layer-1 is deinterleaved and Viterbi-decoded in a conventional manner. The results of the Viterbi decoding are used to reconstruct the actual receive signals of Layer-1, using knowledge of the exact channel state (i.e., phase and magnitude between each transmit antenna-receive antenna pair, per OFDM subcarrier). This reconstructed symbol for MIMO Layer-1 is subtracted from the overall input signal, thereby providing a "cleaner" signal for detection of Layer-2.

Accordingly, symbols received at antennas 902-1, 902-2 are provided to preprocessing circuitry 903, which performs, e.g., Fast Fourier Transformations. The output of preprocessing circuitry 903 is provided to MIMO demapper 904-1, which generates, for each bit coded into the MIMO-ODFM subcarrier (e.g., using QAM modulation), a soft bit using the signals that are received at antennas 902-1, 902-2, and possibly also using extrinsic information obtained from Viterbi decoder 907-1. In the first iteration, no extrinsic information is yet available, so the soft bits are generated based solely on the signals received at antennas 902-1, 902-2. The output from preprocessor 903 is also provided to delay circuits 909-1, 909-2, which, after one symbol period T, provide the preprocessed signals to subtractors 908-1, 908-2. The soft bits generated by demapper 904-1 are provided to deinterleaver 905-1 to be deinterleaved. Viterbi decoder 907-1 then uses the information provided by deinterleaver 905-1 and the properties of the (convolutional) channel code to produce improved soft bits, which Viterbi decoder 907-1 outputs as the decoded MIMO Layer-1 data. The "extrinsic information" is generated by the information bits provided by Viterbi decoder 907-1, which are channel re-encoded and interleaved by encoding interleaver 906, which provides its output to a remodulator KK. Remodulator KK translates the bit stream into complex symbol format, e.g., QAM. The output of remodulator KK is provided to subtractors 908-1, 908-2, each of which provides a signal representing the reconstructed Layer-1 signal subtracted from one of the received input signals, which resulting difference signal is a "cleaner" signal (i.e., due to the removal of the Layer-1 data) that is then provided to MIMO demapper 904-2 for demapping. Using the "cleaner" signal, demapper 904-2 provides soft bits to deinterleaver 905-2, which deinterleaves the soft bits and provides its output to Viterbi decoder 907-2. Viterbi decoder 907-2 provides the decoded MIMO Layer-2 data as its output.

Figure 10:
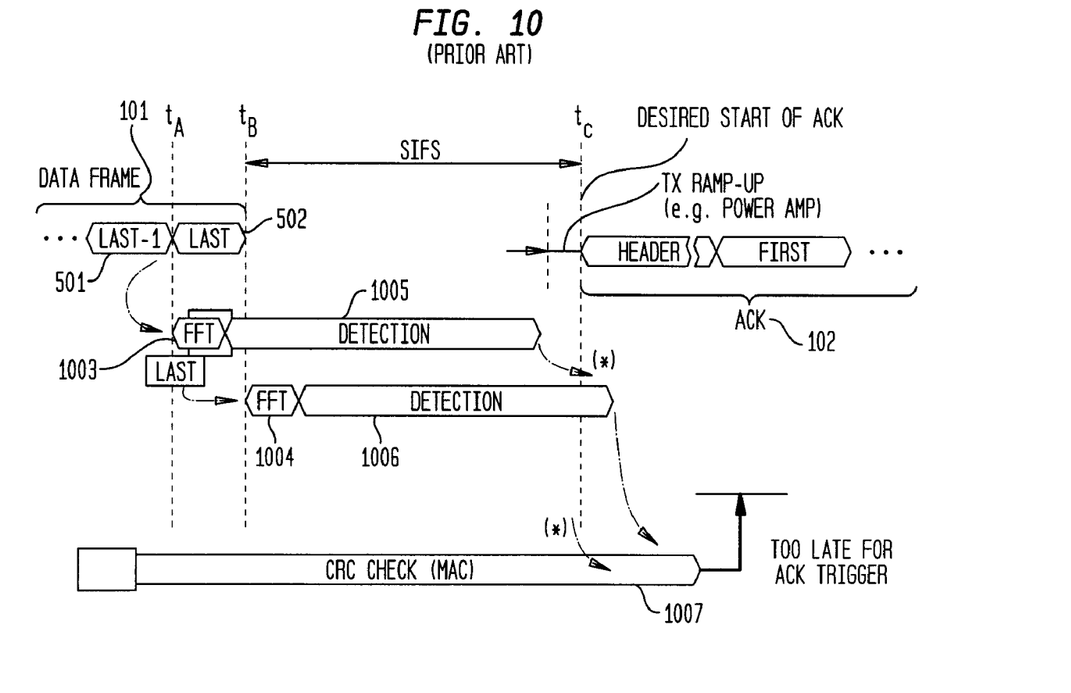
FIG. 10 is a timing diagram illustrating the latency problem in an exemplary prior art data flow in a WLAN receiver using OFDM.

Turning now to FIG. 10, a timing diagram illustrating the latency problem in an exemplary prior art WLAN receiver data flow using OFDM is presented. Last-1 segment 501 represents the penultimate data symbol of frame 101 of FIG. 1. Last segment 502 represents the last data symbol of data frame 101 of FIG. 1. Various analog-to-digital conversion and signal calibration steps (not shown) may be performed on these data symbols. The OFDM data symbol of segment 501 is processed by an FFT (1003) and demodulation/demapping (and possibly deinterleaving) operations (1005). The OFDM data symbol of segment 502 is processed by an FFT (1004) and demodulation/demapping (and possibly deinterleaving) operations (1006). The detected symbols are forwarded to MAC circuitry 1007, where the CRC check is carried out. If the CRC check is successful, then the message should be forwarded to higher communication layers (e.g., TCP/IP), and an ACK frame 102 should be transmitted. However, as can be seen, the SIFS period is not long enough to accommodate the more-involved DSP processing, the delayed completion of the CRC check, and other possible tasks relating to the packet reception. The time required for transmitter ramp-up further aggravates this problem. Accordingly, by the time the CRC check is determined to be successful, it is too late to send ACK frame 102.

Prior art solutions to this latency problem include avoiding the use of advanced, high-performance detection schemes or using fewer iterations in an iterative scheme. These solutions, however, result in decreased performance in terms of packet error rate (PER), effectively leading to lower throughput, which results in lower physical data rates and/or a shorter range between the transmitter and the receiver. Other solutions involve (i) using faster clock speeds and (ii) using parallel processing by employing relatively large-scale circuitry. However, these solutions typically result in increased power consumption and increased fabrication cost for the circuitry.

SUMMARY OF THE INVENTION

Problems in the prior art are addressed in accordance with the principles of the present invention by beginning transmission of an ACK frame before the CRC check is finalized and employing techniques for modifying the ACK frame. Accordingly, if the CRC check fails due to an erroneous frame, then the remaining parts of the ACK frame being transmitted are modified, e.g., prematurely terminated or altered, so as to cause retransmission of the data frame.

In one embodiment, the present invention provides a method for processing a received encoded data unit. The method comprises: decoding the received encoded data unit; determining whether the encoded data unit has been correctly received; prior to completing the determination of whether the encoded data unit has been correctly received, initiating the transmission of an acknowledgment message; and modifying the transmission of the acknowledgment message if it is determined that the data unit has not been correctly received.

In another embodiment, the present invention provides a station for a communications network. The station comprises: a decoder adapted to decode a received encoded data unit; a check processor adapted to determine whether the encoded data unit has been correctly received; and a transmitter adapted to initiate the transmission of an acknowledgment message prior to the check processor completing the determination whether the encoded data unit has been correctly received. The transmitter is adapted to modify the transmission of the acknowledgment message if the check processor determines that the data unit has not been correctly received.

In a further embodiment, the present invention provides a machine-readable medium, having encoded thereon program code, wherein, when the program code is executed by a machine, the machine implements a method for processing a received encoded data unit. The method comprises: decoding the received encoded data unit; determining whether the encoded data unit has been correctly received; prior to completing the determination of whether the encoded data unit has been correctly received, initiating the transmission of an acknowledgment message; and modifying the transmission of the acknowledgment message if it is determined that the data unit has not been correctly received.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In a typical WLAN decoding scheme, a station (e.g., a receiver, modem, or similar device) detects an incoming packet (e.g., a data frame) and, by reading the destination Medium Access Control (MAC) address in the frame header, determines whether it is the intended recipient. If so, and if the station determines that the incoming packet was received intact (e.g., via a CRC check), then the station transmits an acknowledgment (ACK) frame back to the transmitting station. In a decoding scheme consistent with the present invention, the transmission of the ACK frame is initiated at the expiration of the Short Interframe Spacing (SIFS) period, even if the CRC check has not yet returned its result. In the meantime, the packet detection (e.g., using Iterative Demapping/Decoding (IDD) or Successive Interference Cancellation (SIC)) and CRC check are finalized. If the CRC check is successful, then normal transmission of the ACK frame is completed. However, if the CRC check fails, then the ACK frame is modified from its proper form either (i) by terminating the ACK frame prematurely or (ii) by altering the remaining portion of the ACK frame. In either case, the modified ACK frame will cause the transmitter to retransmit the data frame to the station at a later time. Accordingly, advanced detection schemes for wireless LANs, such as in the case of MIMO-OFDM, can achieve throughput efficiency with fewer latency problems, thereby potentially increasing either range, data transfer rates, or both.

Figure 11:
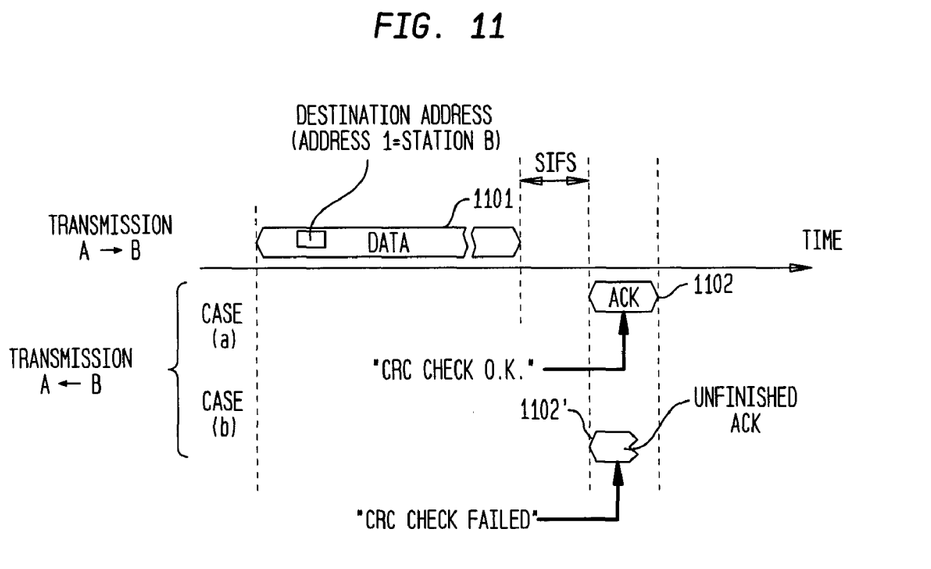
FIG. 11 is a timing diagram illustrating a first exemplary method, consistent with one embodiment of the present invention, for transmitting (i) a data frame from a first station to a second station and (ii) an ACK frame from the second station to the first station, wherein the ACK frame is modified by prematurely terminating the ACK frame if the CRC check has failed.

Turning now to FIG. 11, a timing diagram is provided for a first exemplary method, consistent with one embodiment of the present invention, for transmitting (i) a data frame from a first station to a second station and (ii) an ACK frame from the second station back to the first station, wherein the ACK frame is prematurely terminated if the CRC check has failed. As can be seen, first, a data frame 1101 is transmitted from station A to station B. The total amount of time that station B has to switch between reception of data frame 1101 and transmission of ACK frame 1102 is limited by the SIFS period. During the SIFS period, station B would ordinarily have to accomplish all tasks related to the reception of data frame 1101, including (i) performing frame detection using advanced detection schemes and (ii) determining the integrity of the packet by performing a CRC check on the overall frame. However, in the process of FIG. 11, assuming that the packet has the correct destination address (i.e., station B), the transmission of ACK frame 1102 begins before the detection processing and the CRC check have been completed. When the CRC check is complete, it can be seen in FIG. 11 that a portion of ACK frame 1102 has already been transmitted.

Once the CRC check result is available, which is before the overall completion of transmission of ACK frame 1102, station B can react accordingly. In case (a), the CRC check is passed, and the remainder of ACK frame 1102 is transmitted, signaling to station A that station B successfully received the data frame. In case (b), the CRC check is unsuccessful, and transmission of ACK frame 1102 is prematurely terminated, such that only a partial ACK frame 1102' is transmitted. Since the ACK frame is incomplete, no complete ACK frame is ever received, and station A generates a time-out and will retransmit data frame 1101 at a later time. If the frame is destined for a station other than station B, then the transmission of an ACK frame is not initiated by station B.

Figure 12:
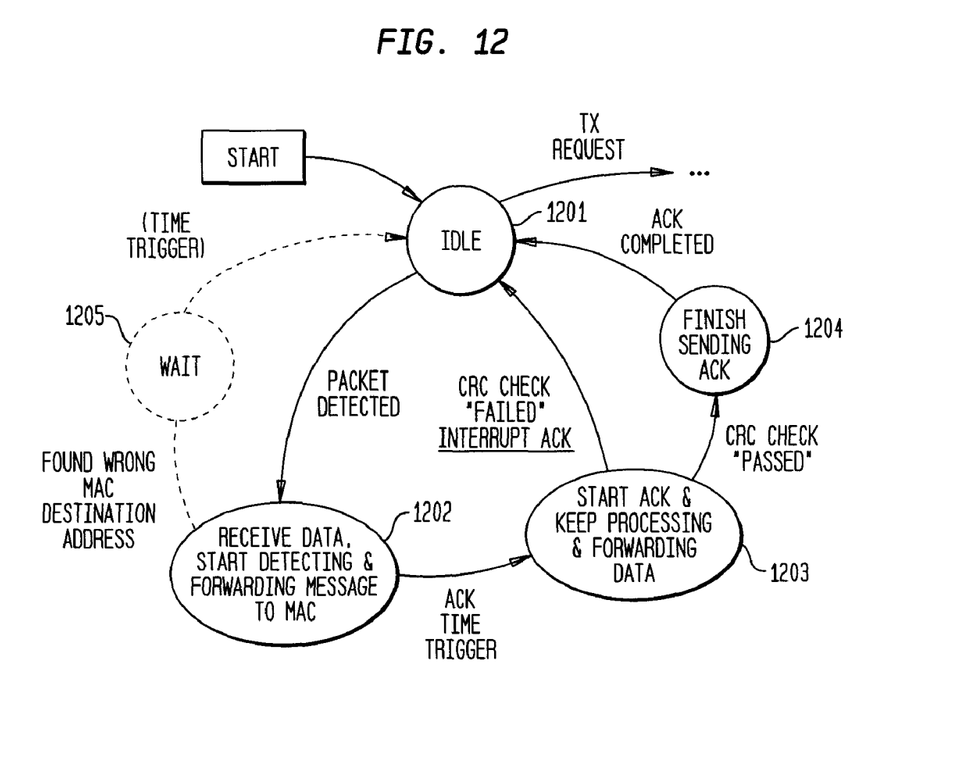
FIG. 12 is a state diagram illustrating exemplary states of a state machine implementing the exemplary method of FIG. 11.

FIG. 12 is a state diagram illustrating exemplary states of a state machine in a WLAN receiver using OFDM in the exemplary method of FIG. 11, wherein the state machine is embodied in a receiver corresponding to the role of station B of FIG. 11. The states include Idle state 1201, Receive and Detect Data & Send to MAC state 1202, Start ACK frame and Continue Processing and Forwarding Data state 1203, Finish ACK frame state 1204, and Wait state 1205. The state machine begins in Idle state 1201 and remains there until a packet is detected, in which case Receive and Detect Data & Send to MAC state 1202 is entered. In Receive and Detect Data & Send to MAC state 1202, detection and CRC checking are performed. If during the detection process, it is determined that the MAC destination address (e.g., Address 1 field in FIG. 3) reveals that the packet is intended for another station, then the present station will revert to Idle state 1201. This reversion might not occur until a time trigger is issued that the channel is once again usable, the wait for the time trigger being represented by Wait state 1205. If the MAC destination address reveals that the packet is indeed intended for the present station, then the detection process continues. Before the completion of the detection process and CRC check, Start ACK frame and Continue Processing and Forwarding Data state 1203 is entered, the ACK frame transmission is initiated, and processing continues. If it is determined that the CRC check has failed, then the state machine returns to Idle state 1201, and the ACK frame transmission is not completed. If it is determined that the CRC check is successful, then the state machine enters Finish ACK frame state 1204, and the remainder of the ACK frame is transmitted. Once the ACK frame is complete, the state machine returns to Idle state 1201. It is noted that, instead of remaining in a wait state pending the detection and the outcome of the CRC check (as in prior art FIG. 6), the detection and CRC check continue while the ACK frame transmission begins. It is further noted that the station acting as a receiver can transmit its own frames as well; in this case, in the initial Idle state 1201, the receiver would undergo other states, not shown in FIG. 12 or described herein.

Figure 13:
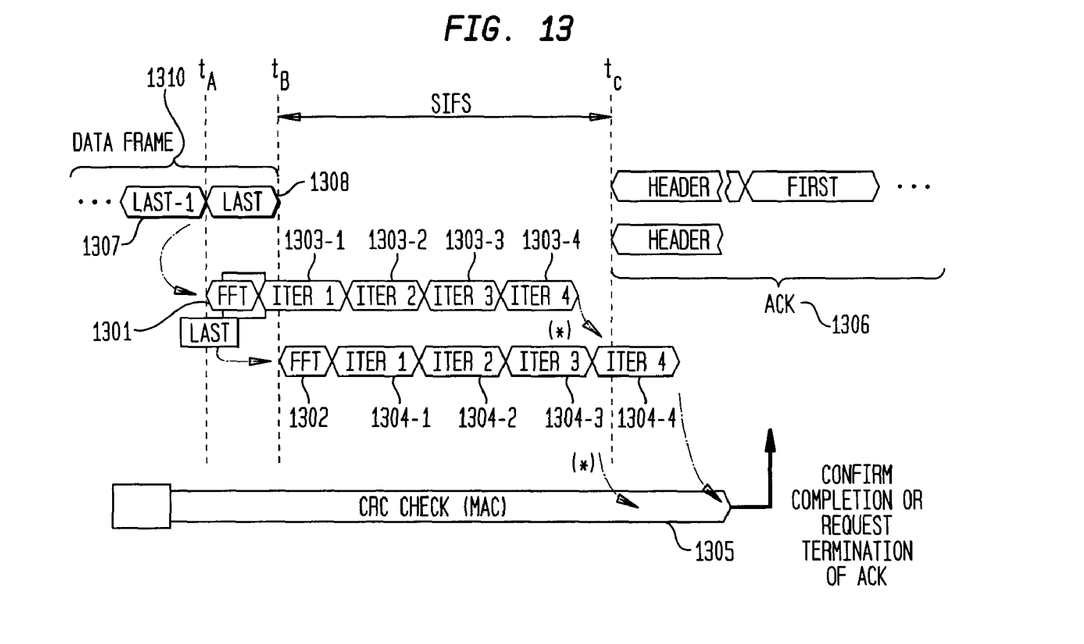
FIG. 13 is a timing diagram illustrating the exemplary method of FIG. 11 in a detection scheme employing Iterative Demapping/Decoding (IDD)

FIG. 13 is a timing diagram illustrating the exemplary method of FIG. 11 in a detection scheme employing Iterative Demapping/Decoding (IDD), wherein the data flow shown corresponds to the role of station B of FIG. 11. Last-1 segment 1307 represents the penultimate data symbol of the data frame currently being decoded. Last segment 1308 represents the last data symbol of the data frame currently being decoded. Various analog-to-digital conversion and signal calibration steps (not shown) may be performed on these data symbols. The OFDM data symbol of segment 1307 is processed by an FFT (1301) and demodulation/demapping (and possibly deinterleaving) operations (1303-1, 1303-2, 1303-3, 1303-4). The OFDM data symbol of segment 1308 is processed by an FFT (1302) and demodulation/demapping (and possibly deinterleaving) operations (1304-1, 1304-2, 1304-3, 1304-4). During the iterative detection process, the detected symbols are forwarded to MAC circuitry 1305, where the CRC check is carried out. As shown, transmission of ACK frame 1306 begins before the completion of the iterative detection process. If the CRC check is successful, then the message should be forwarded to higher communication layers (e.g., TCP/IP), and the remainder of ACK frame 1306 is transmitted. If the CRC check is unsuccessful, then ACK frame 1306 is never completed, so that the data frame will be retransmitted.

Figure 14:
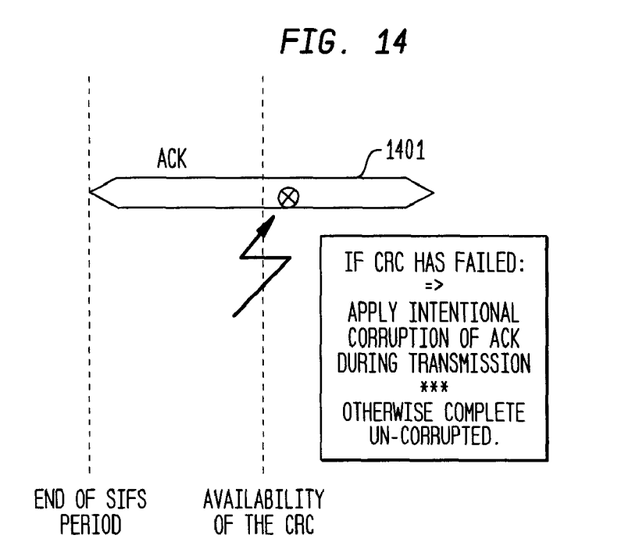
FIG. 14 is a timing diagram illustrating a second exemplary method, consistent with one embodiment of the present invention, for transmitting an ACK frame, wherein the ACK frame is manipulated if the CRC check has failed.
Figure 15:
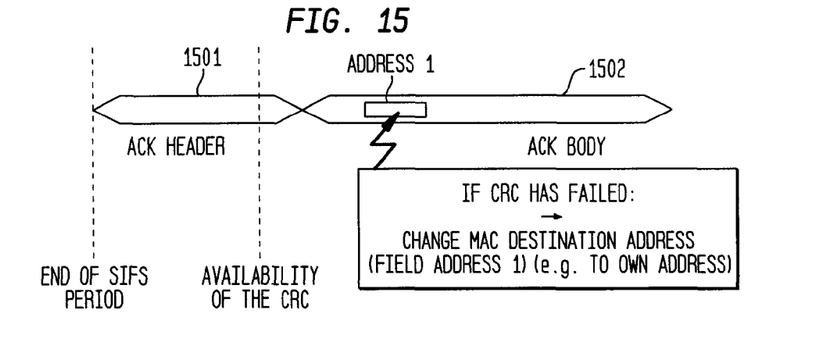
FIG. 15 is a timing diagram illustrating a first variation of the exemplary method of FIG. 14, wherein the ACK frame is modified by changing the MAC destination address in the ACK frame body.

As illustrated in the timing diagram of FIG. 14, in a second exemplary method consistent with one embodiment of the present invention, instead of prematurely terminating ACK frame 1401, the bits of ACK frame 1401 are altered if the CRC check fails. As shown, once the outcome of the CRC check is available, transmission of the intentionally corrupted (or "poisoned") ACK frame 1401 is completed. When the transmitting station receives corrupted ACK frame 1401, it will retransmit the original data frame. For certain implementations, this scheme may provide advantages over the use of a prematurely terminated ACK frame, because energy is "on the air" for the amount of time corresponding to a true ACK frame, to prevent other stations (i) from being "confused" by the unexpected drop in energy in the medium and (ii) from entering a medium access recovery mode. While a variety of ways for modifying the ACK frame are possible, any modification of bits in the ACK frame body that leads to inconsistencies between the detected data and the ACK frame checksum at the transmitter will cause the transmitter's CRC check to fail and the original frame to be retransmitted. Two exemplary modifications are discussed below:

FIG. 15 is a timing diagram illustrating a first variation of the exemplary method of FIG. 14, wherein the ACK frame is manipulated by changing the MAC destination address in ACK frame body 1502. The method is similar to that illustrated in FIGS. 11-13, in that the transmission of ACK frame header 1501 is initiated before the CRC check result is available. However, upon detection that the CRC check has failed, instead of prematurely terminating the ACK frame, the MAC destination address (field Address 1) in body 1502 of the ACK frame is changed from the original transmitting station (station A) to a replacement address. For example, the replacement address can be the address of a non-existing, dummy station, or alternatively, the address of the receiving station itself (station B). Accordingly, no other station will be addressed by the ACK frame, and station A will eventually initiate a retransmission of the lost data frame.

Figure 16:
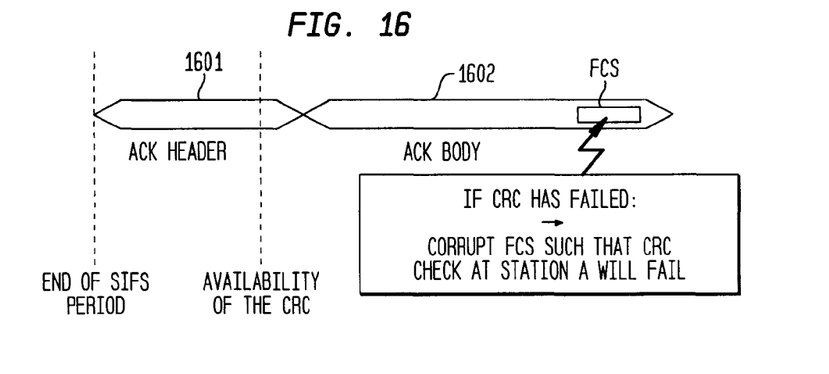
FIG. 16 is a timing diagram illustrating a second variation of the exemplary method of FIG. 14, wherein the ACK frame is modified by corrupting one of the bits in the ACK frame body.

FIG. 16 is a timing diagram illustrating a second variation of the exemplary method of FIG. 14, wherein the ACK frame is manipulated by corrupting one or more of the bits in ACK frame body 1602. The method is similar to that illustrated in FIGS. 11-13, in that the transmission of ACK frame header 1601 is initiated before the CRC check result is available. However, upon detection that the CRC check has failed, instead of prematurely terminating the ACK frame, one or more of the bits in ACK frame body 1602 are rearranged or modified. For example, the Frame Checksum (FCS) used for the CRC check in conjunction with the ACK frame could be altered. Accordingly, upon performing a CRC check on the ACK frame, station A will drop the ACK frame due to the lack of CRC check confirmation and will eventually initiate a retransmission of the lost data frame.

Figure 17:
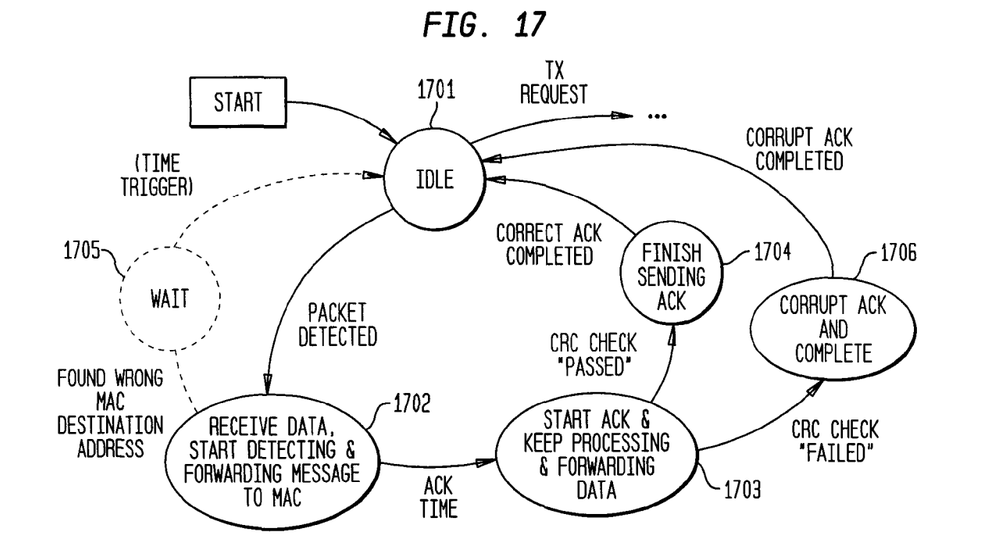
FIG. 17 is a state diagram illustrating exemplary states of a state machine implementing the exemplary method of FIG. 14.

FIG. 17 is a state diagram illustrating exemplary states of a state machine in a WLAN receiver using OFDM in the exemplary method of FIG. 14, wherein the state machine is embodied in a receiver corresponding to the role of station B of FIG. 11. The states include Idle state 1701, Receive and Detect Data & Send to MAC state 1702, Start ACK frame and Continue Processing and Forwarding Data state 1703, Finish ACK frame state 1704, Wait state 1705, and Corrupt and Finish ACK frame state 1706'. The state machine begins in Idle state 1701 and remains there until a packet is detected, in which case Receive and Detect Data & Send to MAC state 1702 is entered. In Receive and Detect Data & Send to MAC state 1702, detection and CRC checking are performed. If, during the detection process, it is determined that the MAC destination address (e.g., Address 1 field in FIG. 3) reveals that the packet is intended for another station, then the present station will revert to Idle state 1701. This reversion might not occur until a time trigger is issued that the channel is once again usable, the wait for the time trigger being represented by Wait state 1705. If the MAC destination address reveals that the packet is indeed intended for the present station, then the detection process continues. Before the completion of the detection process and CRC check, Start ACK frame and Continue Processing and Forwarding Data state 1703 is entered, the ACK frame transmission is initiated, and processing continues. If it is determined that the CRC check has failed, then the state machine enters state 1706, and the contents of the ACK frame transmission are manipulated, as described above with reference to FIGS. 14-16. If it is determined that the CRC check is successful, then the state machine enters Finish ACK frame state 1704, and the remainder of the normal, uncorrupted ACK frame is transmitted. Once the transmission of either the corrupted ACK frame in state 1706 or the uncorrupted ACK frame in state 1704 is complete, the state machine returns to Idle state 1701. Instead of remaining in a wait state pending the detection and the outcome of the CRC check (as in prior art FIG. 6), the detection and CRC check continue while the ACK frame transmission begins. It is further noted that the station acting as a receiver in the present transmit request can transmit its own frames as well, in which case, in the initial Idle state 1701, the receiver would undergo other states, not shown in FIG. 17 or described herein.

It is contemplated that a transceiver or modem device implementing a method consistent with the present invention would have hooks for starting to transmit a packet, i.e., the ACK frame, while still completing the detection process for the incoming packet. One exemplary method of accomplishing these tasks in parallel involves preparing the "good ACK frame" and the "corrupted ACK frame" in the background, e.g., by storing the corresponding time samples in memory. Then, the "good ACK frame" samples are used to start the ACK frame transmission, and as soon as it is determined that the CRC check has failed, the "corrupted ACK frame" time samples can be switched onto the transmitter circuitry.

It should be recognized that a method consistent with the present invention may be used to further shorten the SIFS period time in future WLAN implementations. The PHY header (i.e., preamble, etc.) that forms the early parts of every packet, including ACKs, takes 20 microseconds in current WLAN implementations, and is expected to take longer in future implementations. If, as in the present invention, this time can be used to finalize advanced detection mechanisms before the rest of the ACK frame is either transmitted as normal, or terminated or corrupted as described herein, then performance advantages may be expected for high-speed detection schemes. Accordingly, the present invention may facilitate a high-performance system with high throughput efficiencies due to the reduced SIFS period time, which is an important component of system overhead.

The present invention should be construed as including any method of modifying an acknowledgment message, e.g., terminating the acknowledgment message prematurely, adding bits to or removing bits from the acknowledgment message, modifying the message header, modifying the message body, modifying the message destination address, modifying the CRC value, etc.

It should be recognized that the present invention should not be construed as limited to any particular frame format, e.g., PHY formats for high-speed transmission using advanced MIMO technology, and that it is contemplated that the present invention can be applied to any existing frame formats, as well as those that have not yet been developed. The present invention may also be used with signaling schemes other than OFDM.

Although the present invention is described as implemented in a WLAN, the present invention may also have utility in hardwired implementations, as well as in non-networked wireless communications systems.

While the present invention is described herein as involving the transmission of packets, frames, and messages, the invention may alternatively be embodied in a manner so as to involve the transmission of other data units.

Likewise, although the invention is described herein as employing ACK frames as acknowledgment messages, other forms of acknowledgment messages may be possible in other embodiments of the invention.

The present invention may be implemented as circuit-based processes, including possible implementation as a single integrated circuit (such as an ASIC or an FPGA), a multi-chip module, a single card, or a multi-card circuit pack. Various functions of circuit elements may also be implemented as processing steps in a software program. Such software may be employed in, for example, a digital signal processor, micro-controller, or general-purpose computer.

Unless explicitly stated otherwise, each numerical value and range should be interpreted as being approximate, as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A station for a communications network, the station comprising:
   a decoder adapted to decode a received encoded data unit;
   a check processor adapted to determine whether the entire encoded data unit has been correctly received; and
   a transmitter adapted to initiate, prior to the check processor completing the determination whether the entire encoded data unit has been correctly received, the transmission of an acknowledgment message comprising a frame having a plurality of different fields of data, the acknowledgment message indicating that the entire encoded data unit has been correctly received;
   wherein the transmitter is adapted to modify the transmission of the acknowledgment message prior to completing transmission of the acknowledgement message in response to a determination by the check processor that the data unit has not been correctly received.

2. The station of claim 1, wherein modifying the transmission of the acknowledgment message comprises terminating the transmission of the acknowledgment message without transmitting the entire frame.

3. The station of claim 1, wherein modifying the transmission of the acknowledgment message comprises altering a portion of the contents of the frame during transmission of the frame responsive to determining that the data unit has not been correctly received.

4. The station of claim 3, wherein modifying the transmission of the acknowledgement message further comprises transmitting the altered portion of the frame.

5. The station of claim 3, wherein the altered portion comprises a destination address field.

6. The station of claim 5, wherein modifying the transmission of the acknowledgment message comprises replacing the true destination in the destination address field address with a dummy address.

7. The station of claim 5, wherein modifying the transmission of the acknowledgment message comprises replacing the true destination address in the destination address field with the address of the station receiving the data unit.

8. The station of claim 5, wherein modifying the transmission of the acknowledgment message comprises replacing a checksum value in a field used for a cyclic redundancy check (CRC).

9. The station of claim 3, wherein the transmitter is further adapted to:

store the altered portion in memory as a time sample;
wherein the transmitter is adapted to transmit the altered portion of the acknowledgment message from its stored location.

10. The station of claim 9, wherein the transmitter is further adapted to:
store an unaltered portion of an acknowledgment message in memory as a time sample; and
if the entire encoded data unit has been correctly received, transmit the unaltered portion from its stored location.

11. The station of claim 1, wherein:
the encoded data unit is transmitted at a first station and received at a second station; and
the first and second stations are connected via a wireless network.

12. The station of claim 11, wherein the data unit is a MIMO-encoded packet.

13. A computer-readable storage medium, having encoded thereon program code, wherein, when the program code is executed by a computer, the computer implements a method for processing a received encoded data unit, the method comprising:
(a) decoding the received encoded data unit;
(b) determining whether the entire encoded data unit has been correctly received;
(c) prior to completing the determination in step (b) of whether the entire encoded data unit has been correctly received, initiating the transmission of an acknowledgment message comprising a frame having a plurality of different fields of data, the acknowledgment message indicating that the entire encoded data unit has been correctly received; and
(d) modifying the transmission of the acknowledgment message prior to completing transmission of the acknowledgment message in response to a determination in step (b) that the data unit has not been correctly received.

14. A receiver-implemented method for processing a received encoded data unit, the method comprising:
(a) the receiver decoding the received encoded data unit;
(b) the receiver determining whether the entire encoded data unit has been correctly received;
(c) prior to completing the determination in step (b) of whether the entire encoded data unit has been correctly received, the receiver initiating the transmission of an acknowledgment message, the acknowledgment message indicating that the entire encoded data unit has been correctly received; and
(d) the receiver modifying the transmission of the acknowledgment message prior to completing transmission of the acknowledgment message in response to a determination in step (b) that the data unit has not been correctly received;

wherein:
step (b) comprises a step of the receiver determining that the entire encoded data unit has not been correctly received; and
step (d) comprises altering a portion of the contents of the acknowledgment message responsive to a determination in step (b) that the data unit has not been correctly received;
and further comprising:
(e) the receiver storing the altered portion in memory as a time sample, wherein the step of modifying the transmission of the acknowledgment message comprises transmitting the altered portion of the acknowledgment message from its stored location.

15. The method of claim 14, further comprising:
the receiver storing an unaltered portion of an acknowledgment message in memory as a time sample; and
the receiver transmitting the unaltered portion from its stored location if the entire encoded data unit has been correctly received.

16. A station for a communications network, the station comprising:
a decoder adapted to decode a received encoded data unit;
a check processor adapted to determine whether the entire encoded data unit has been correctly received; and
a transmitter adapted to initiate the transmission of an acknowledgment message prior to the check processor completing the determination whether the entire encoded data unit has been correctly received, the acknowledgment message indicating that the entire encoded data unit has been correctly received;
wherein the transmitter is further adapted to:
modify the transmission of the acknowledgment message prior to completing transmission of the acknowledgement message in response to a determination by the check processor that the data unit has not been correctly received;
determine that the entire encoded data unit has not been correctly received and modify the transmission of the acknowledgment message by altering a portion of the contents of the acknowledgment message during transmission of the acknowledgment message responsive to determining that the data unit has not been correctly received;
store the altered portion in memory as a time sample; and
transmit the altered portion of the acknowledgment message from its stored location.

17. The station of claim 16, wherein the transmitter is further adapted to:
store an unaltered portion of an acknowledgment message in memory as a time sample; and
if the entire encoded data unit has been correctly received, transmit the unaltered portion from its stored location.

* * * * *